May 22, 1923.

H. WESTPHAL

SUPPORT FOR OVERHEAD WIRES OF ELECTRIC RAILWAYS

Filed Oct. 7, 1922

1,456,084

Inventor:
Hans Westphal;
by *Albert S. Davis*
His Attorney.

Patented May 22, 1923.

1,456,084

UNITED STATES PATENT OFFICE.

HANS WESTPHAL, OF BERLIN, GERMANY, ASSIGNOR TO GENERAL ELECTRIC COMPANY, A CORPORATION OF NEW YORK.

SUPPORT FOR OVERHEAD WIRES OF ELECTRIC RAILWAYS.

Application filed October 7, 1922. Serial No. 593,151.

*To all whom it may concern:*

Be it known that I, HANS WESTPHAL, a citizen of the German Republic, residing at the city of Berlin, Germany, have invented certain new and useful Improvements in Supports for Overhead Wires of Electric Railways, of which the following is a specification.

The present invention relates to supports for trolley or other overhead wires of electric railways and has for its object to improve and simplify their construction, and especially by decreasing their cost and increasing their strength and reliability in service.

For a consideration of what I believe to be novel and my invention, attention is directed to the accompanying description and the claims appended thereto.

Figure 1:
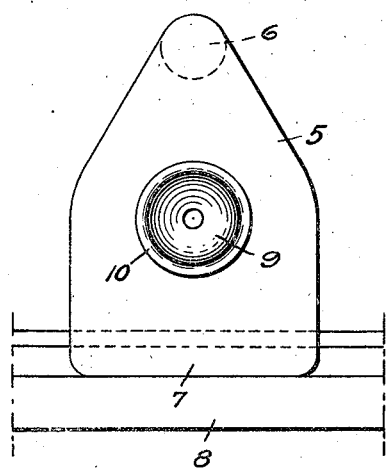
Figure 2:
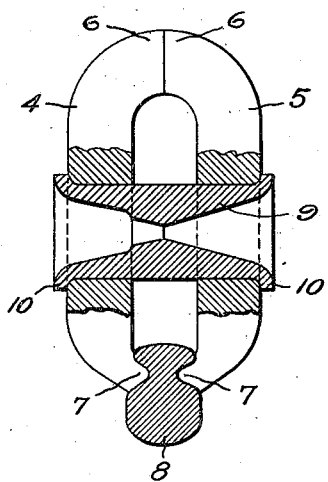

In the drawing, which is illustrative of the invention, Fig. 1 is a side view of a trolley wire clamp or support; Fig. 2 is an end view of the same with certain of the parts in section and Fig. 3 is a slight modification of the form of the rivet.

4 and 5 indicate the parts of a two-part clamp. Each part or member is provided with a rounded projection 6 at the top and a relatively wide lower portion having a toe 7 which fits into the side groove on the trolley wire 8. When assembled in place the projections 6 are in firm engagement with each other and the toes are in the grooves on opposite sides of the trolley wire. One way to look at the structure is that the parts 4 and 5 form levers of which the projections 6 form the fulcrum. In addition to forming a fulcrum for the said parts the projections 6 form a means by which the clamp as a whole can be supported from a wire cable or other device.

Each clamp is also provided with a hole to receive the hollow rivet 9. On account of the great mechanical stresses to which the rivet is subjected, due to the load on the clamp, the wall of the middle portion thereof is made thicker than at the ends while the outside diameter is made uniform throughout. The outer ends of the rivet are turned over as indicated at 10 to securely hold the parts of the clamp against spreading. The thickening of the middle portion of the rivet also has the special advantage that by driving in a cylindrical pin of suitable diameter and shape, the wall of the rivet may be expanded to make snug fits with the walls of the holes in the clamps and in this manner an essentially more reliable connection is made than by simply turning over the outer ends of the rivet.

Figure 3:
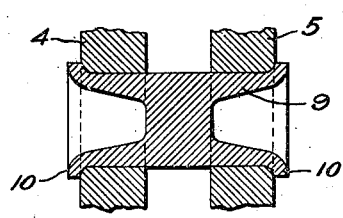

In Fig. 3 is shown a slightly modified type of rivet in which the middle portion instead of having a small opening therein is made solid. It has, however, the same characteristic as the rivet of Fig. 2 in that the thickness of the wall decreases from the middle portion toward both ends, and is adapted to receive a pin for expanding the rivet to make a snug fit with the walls of the holes in the clamp.

Instead of holding a trolley wire it is evident that the clamp may be employed for supporting a cable.

In utilizing my improved construction it is preferable to firmly secure the rivet in one of the clamps at the place of manufacture and to complete the work at the point of installation since this simplifies the procedure and decreases the amount of outside work.

In accordance with the provisions of the patent statutes, I have described the principle of operation of my invention, together with the apparatus which I now consider to represent the best embodiment thereof, but I desire to have it understood that the apparatus shown is illustrative and that the invention may be carried out by other means.

What I claim as new and desire to secure by Letters Patent of the United States, is:—

1. In a wire-supporting device, the combination of a pair of clamps which are arranged to hold a wire between them with a rivet which passes through the clamps and is turned over at its ends to unite them, said rivet having a wall which increases in thickness from the ends toward the center.

2. In a wire-supporting device, the combination of a pair of clamps which are arranged to hold a wire between them, said clamps having engaging projections on their upper ends and wire-engaging toes on their lower ends, with a rivet which passes through the clamps and is turned over at its ends to unite them, said rivet being of uniform outside diameter and having a wall which increases in thickness from the ends toward the center.

In witness whereof I have hereunto set my hand this twelfth day of September, 1922.

HANS WESTPHAL.